(12) United States Patent
Larson et al.

(10) Patent No.: US 12,509,046 B2
(45) Date of Patent: Dec. 30, 2025

(54) ELECTRIC DISC BRAKE SYSTEM

(71) Applicant: TRP International LLC, Elkhart, IN (US)

(72) Inventors: Blake Larson, Chandler, AZ (US); Brenden Meyer, Savannah, GA (US); Dillon Moreland, Chicago, IL (US); Frank Cormier Muehleman, Austin, TX (US); Samuel Wing Rudder, Wheat Ridge, CO (US); Tanner Nicholas Skrove, Omaha, NE (US)

(73) Assignee: TRP International, LLC, Elkhart, IN (US)

( * ) Notice: Subject to any disclaimer, the term of this patent is extended or adjusted under 35 U.S.C. 154(b) by 543 days.

(21) Appl. No.: 17/818,438

(22) Filed: Aug. 9, 2022

(65) Prior Publication Data

US 2023/0044194 A1    Feb. 9, 2023

Related U.S. Application Data (60) Provisional application No. 63/230,896, filed on Aug. 9, 2021.

(51) Int. Cl.
| | |
|---|---|
| *B60T 13/74* | (2006.01) |
| *B60T 1/06* | (2006.01) |
| *B60T 8/172* | (2006.01) |
| *B60T 8/88* | (2006.01) |
| *F16D 55/226* | (2006.01) |

(Continued)

(52) U.S. Cl.
CPC .......... *B60T 13/746* (2013.01); *B60T 1/065* (2013.01); *B60T 8/172* (2013.01); *B60T 8/88* (2013.01); *F16D 55/226* (2013.01); *F16D 65/18* (2013.01); *H02K 7/108* (2013.01); *B60T 2270/82* (2013.01); *F16D 2121/24* (2013.01); *F16D 2125/40* (2013.01)

(58) Field of Classification Search
CPC . B60T 1/065; B60T 8/172; B60T 8/88; F16D 55/226; F16D 65/18; H02K 7/108
See application file for complete search history.

(56) References Cited

U.S. PATENT DOCUMENTS

| | | | |
|---|---|---|---|
| 5,615,930 A * | 4/1997 | McGrath ................. | B60T 13/58 303/7 |
| 5,915,504 A | 6/1999 | Doricht | |

(Continued)

FOREIGN PATENT DOCUMENTS

| | | |
|---|---|---|
| GB | 1519980 | 8/1978 |
| KR | 101670675 | 10/2016 |

*Primary Examiner* — Nicholas J Lane
(74) *Attorney, Agent, or Firm* — McHale & Slavin, P.A.

(57) ABSTRACT

An electric disc brake system for a trailer. The brake system employs a caliper assembly that is attached to the trailer with floating fasteners, wherein the caliper assembly straddles an axle mounted rotor positioning an inner and outer brake pad adjacent to the rotor. A screw drive assembly is attached to the caliper. The assembly includes an electric motor coupled to a piston by a threaded shaft. The screw drive assembly converts rotation of the electric motor into linear motion to movement of the piston, wherein the inner and outer brake pads engage the rotor based upon the amount of pressure applied by the piston. A controller reacts to the pressure applied to a brake pedal to cause the electric motor to rotate in a clockwise or counter-clockwise direction.

13 Claims, 11 Drawing Sheets

(51) Int. Cl.
  *F16D 65/18* (2006.01)
  *H02K 7/108* (2006.01)
  *F16D 121/24* (2012.01)
  *F16D 125/40* (2012.01)

(56) References Cited

U.S. PATENT DOCUMENTS

| | | | |
|---|---|---|---|
| 2006/0180365 A1* | 8/2006 | Innami | B60L 50/61 |
| | | | 180/65.51 |
| 2012/0168264 A1* | 7/2012 | Putz | F16D 65/18 |
| | | | 188/72.1 |
| 2013/0062148 A1* | 3/2013 | Park | B60T 13/741 |
| | | | 188/72.1 |
| 2015/0217746 A1* | 8/2015 | Jeon | B60T 17/22 |
| | | | 701/70 |
| 2015/0300433 A1 | 10/2015 | Yasui et al. | |
| 2018/0031065 A1* | 2/2018 | Shabbir | F16D 66/026 |
| 2018/0345934 A1* | 12/2018 | Weh | B60T 8/4018 |
| 2019/0120310 A1* | 4/2019 | Al-Mahshi | F16D 55/22 |
| 2019/0120311 A1* | 4/2019 | Al-Mahshi | B60T 1/065 |
| 2019/0315320 A1* | 10/2019 | Maat | B60T 7/20 |
| 2019/0389440 A1* | 12/2019 | Kamio | B60W 10/10 |
| 2020/0182320 A1* | 6/2020 | Barbosa | F16D 65/18 |
| 2021/0364055 A1* | 11/2021 | Lou | F16D 55/2265 |
| 2022/0169218 A1* | 6/2022 | Takasuga | B60T 8/1755 |

\* cited by examiner

Fig. 6B $$T = \frac{F \cdot d_m}{2} * \frac{(l + \pi f \sec(a))}{(\pi d_m - f l \sec(a))}$$

where: $d_m$ is the mean diameter of warm gear $l$ is the pitch $f$ is the coefficient of friction $a$ is the pitch angle on the thread $f$ is the resultant axial force $$T = \frac{7800\ (lbf) * 0.8425(in)}{2} * \frac{(0.05\ in + \pi(0.034)\sec(1.09°))}{(\pi(0.8425in)-(0.034)(0.05\ in)\sec(1.09°))}$$

$T = 304.1\ in\text{-}lb$

Our motor was 50 in-lb

This difference in torque can be obtained in later designs by increasing the size of the motor

Fig. 7A $$\tan(\lambda) = \frac{l}{\pi\ d_m} \longrightarrow \tan^{-1}\left(\frac{0.05}{\pi * 0.8425}\right) = 1.0827$$

$$V_3 = \frac{\pi * RPM(rev/sec) * d_m}{12 * \cos(\lambda)} \quad \frac{\pi * \left(\frac{25 RPM}{60}\right) * 0.8425}{12 * \cos(1.0827)} = 0.0919\ \frac{in}{sec}$$

Distance of each brake pad from rotor is 0.05 in $$\frac{0.05 * 2}{0.0919\ in/sec} = 1.088\ seconds$$

where: $d_m$ is the mean diameter of the power screw $l$ is the pitch $\lambda$ is the lead angle or pitch angle

Fig. 11

# ELECTRIC DISC BRAKE SYSTEM

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/230,896, entitled "ELECTRIC DISC BRAKE SYSTEM FOR A UTILITY TRAILER" filed Aug. 9, 2021, the contents of which are incorporated herein by reference.

BACKGROUND OF THE INVENTION

Trailers may be towed behind passenger vehicles including cars and pick-up trucks. Trailer can be further defined to include boat trailers, camper trailers, open and enclosed cargo trailers, RV trailers, horse trailers, and so forth. Trailers are used to haul most anything that will fit within the dimensions of the trailer, or serve as a platform for items that may exceed the trailer dimensions.

Trailers are unique in that they can be designed to carry loads and can be secured to most any type of vehicle capable of supporting the load. Unfortunately, trailers can be quickly overloaded resulting in changes to the vehicle towing ability. The result is that a trailer may be loaded into a condition that is unsuitable for towing by the vehicle. For instance, a trailer may be overloaded with weight which can exceed the capacity of the towing vehicle, especially the stopping ability. It is well known that consumers who own trailers do not weigh every item placed thereon, and there is no law that requires the consumer purchase a particular towing vehicle designed for the load size. Even if a larger vehicle is employed, such as a truck with a fifth wheel, the condition of the towing vehicle may not meet the desired specifications due to worn brakes, worn tire threads, and so forth. Further, road conditions can change the vehicles towing ability, such as sloped, wet or snow covered pavement. No matter what size the towing vehicle is, if the characteristics of the towing do not match the trailer requirements, the towing vehicle and trailer can form a dangerous combination on the open road.

A necessity with towing a trailer is to make sure the towing vehicle is able to stop the forward momentum of the trailer, or the trailer has the ability to slow or stop itself. If the momentum of a trailer exceeds the braking capacity of the towing vehicle, the trailer will continue with forward movement in respect to the trailer mass, leaving the towing vehicle with reduced braking capacity. Should fast deceleration be required, a trailer may overtake the towing vehicle, resulting in a jackknife condition. Should the pavement be wet, a trailer can easily exceed a towing vehicle's control limitations and become a liability.

Trailers commonly employ hydraulic or electric actuated brakes. Hydraulic brakes are complex and expensive, but have high braking force. Electric drum brakes are simple to install and inexpensive, but lack the braking force recognized by hydraulic disc brake systems.

The cost and complexity of trailer braking systems becomes the basis for some consumers to avoid brake installation altogether, choosing to rely upon the towing vehicle's braking system. However, most vehicles are not designed to accommodate the additional load placed on the braking system by a trailer. Further, even if a large vehicle is towing a trailer, certain road conditions demand the use of trailer mounted brakes to prevent jackknifing or like trailer induced situations.

The importance of trailer braking cannot be emphasized enough. The National Highway Traffic Safety Administration (NHTSA) reports an average no less than 400 deaths each year in the United States because of an accident involving a trailer. Trailer accidents represent approximately 3% of all fatalities involving passenger vehicles.

What is needed in the industry is an electric braking system for a trailer that is more efficient and lower in cost than conventional braking systems.

SUMMARY OF THE INVENTION

Disclosed is an electric disc brake system for a trailer that creates braking force by turning rotational motion of a threaded shaft into linear motion for movement of a piston. The electric disc brake system comprises a caliper assembly attached to the trailer with floating fasteners, allowing the caliper assembly to straddle an axle mounted rotor. An inner brake pad is slidably secured to the caliper and juxtapositioned to an inner surface of the rotor. An outer brake pad is slidably secured to the caliper and juxtapositioned to an outer surface of the rotor. A power screw assembly is attached to the caliper and employs an electric motor coupled to a piston by use of a screw drive. The screw drive converts rotation of the motor into linear motion to push the piston, wherein the inner and outer brake pads engage the rotor based upon the amount of pressure applied by the piston. A controller reacts to the pressure applied to a brake pedal to cause the electric motor to rotate in a clockwise or counter-clockwise direction.

An objective of the invention is to provide a low-cost trailer braking system for trailers that would improve the safety of trailers while incorporating existing components such as the axle, rotor, and calipers from a conventional disc brake system.

Another objective of the invention is to teach the use of an electric disc brake system that can provide the braking force of hydraulic brakes.

Other objectives, benefits and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DESCRIPTION OF THE PREFERRED EMBODIMENT

It is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
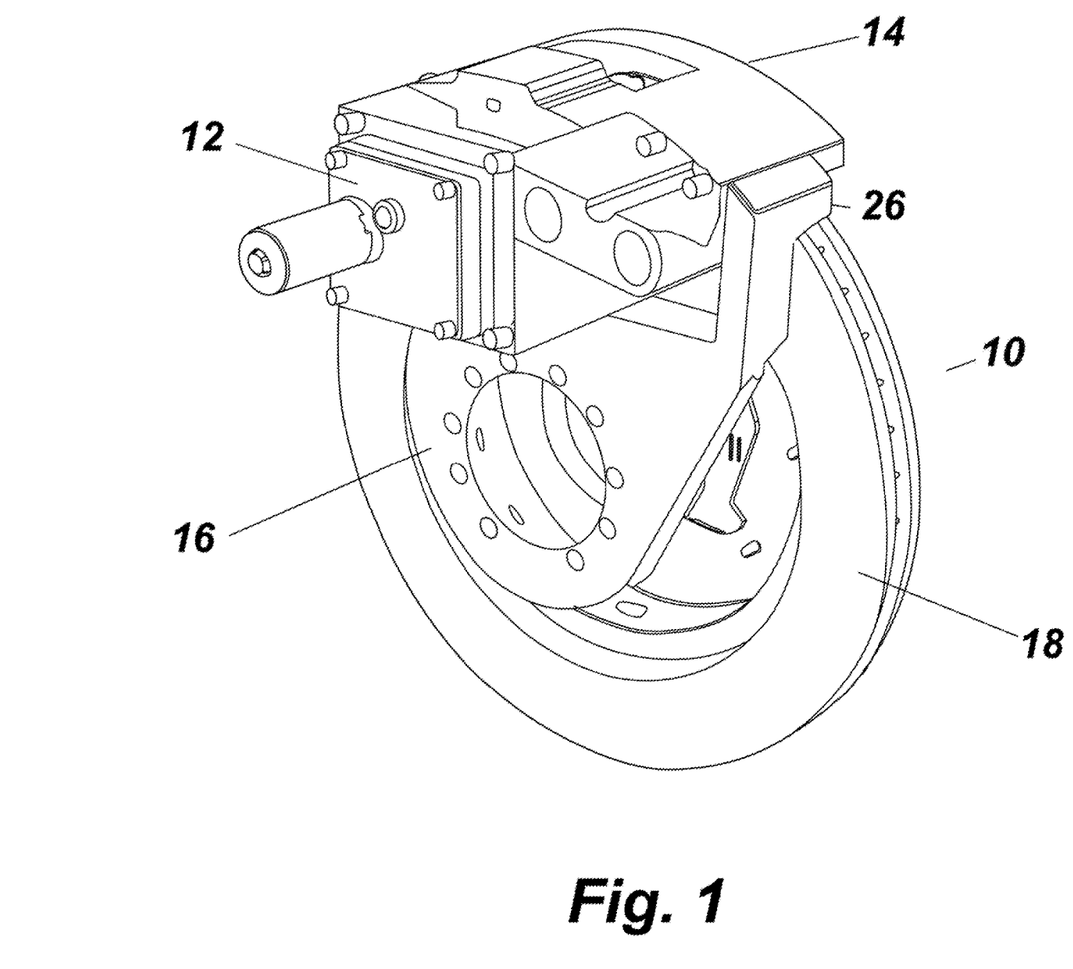
FIG. 1 is a pictorial view of electric disc brake system components of a first embodiment.
Figure 2:
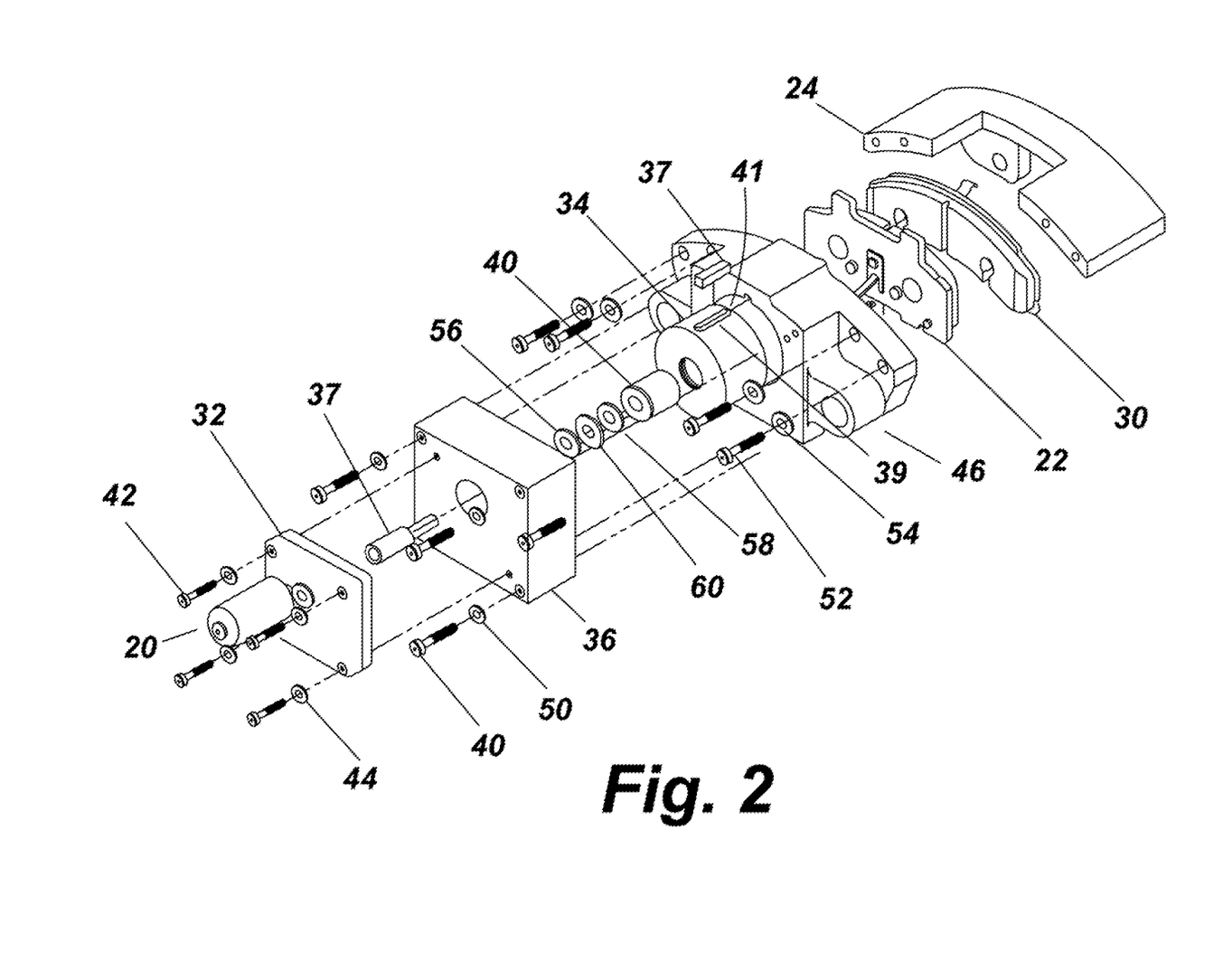
FIG. 2 is an exploded view thereof.
Figure 3:
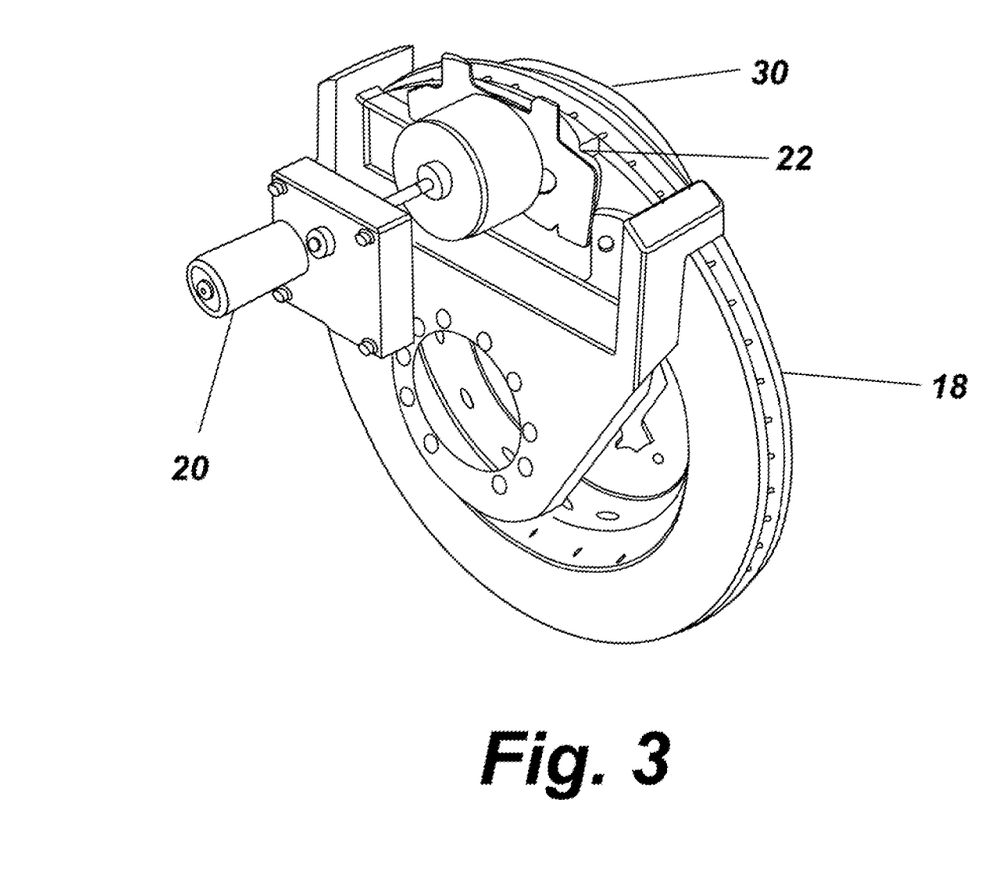
FIG. 3 is a pictorial view of an exposed threaded shaft and piston.

Referring now to FIGS. 1-3, depicted is the electric disc brake assembly 10 comprising a power screw assembly 12 mounted to a caliper 14 by a caliper mounting bracket 16 positioned about a rotor 18. The power screw assembly 12 converts rotation of an electric motor 20 into linear motion to push an inner brake pad 22 onto the rotor 18, which causes the entire caliper assembly 24 to move on floating fasteners 26 that attach it to the mounting bracket 16. The caliper assembly 24 moves until the outer brake pad 30 contacts the rotor 18 and wherein a clamping force is applied between the brake pads 22 and 30 to slow the rotor 18. Once the brakes are released, the motor 20 rotates in the opposite direction to release the pressure on the brake pads 22 and 30 against the rotor 18.

The power screw assembly 12 employs an electric motor 20 coupled to a motor support 32 which is spaced apart from a drive piston 34 by a spacer 36. The motor 20 has a motor shaft extension 37 converting rotation of the electric motor 20 into linear motion by use of a threaded shaft 40 to push the inner brake pad 22 onto the rotor 18, which further draws the caliber assembly 24 causes an equal force to be applied against the outer brake pad 30. The electric motor 20 and motor support 32 are coupled to the spacer 36 by a plurality of fasteners 42 and associated washers 44. The spacer 36 is coupled to the caliper base 46 by a plurality of spacer fasteners 48 and associated washers 50. The caliper 24 is coupled to the caliper base 46 by caliper fasteners 52 and associated washers 54. The motor shaft extension 37 is operatively associated with the threaded shaft 40 using thrust washers 56 and 58, and a needle thrust bearing 60. Electrical power provided to the motor 20 causes the threaded shaft 40 to rotate, causing the brake pads 22 and 30 to contact the rotor 18 when the threaded shaft 40 is rotated in one direction, and retracts the brake pads 22 and 30 from contacting with the rotor 18 when the threaded shaft 40 is rotated in an opposite direction.

Figure 4:
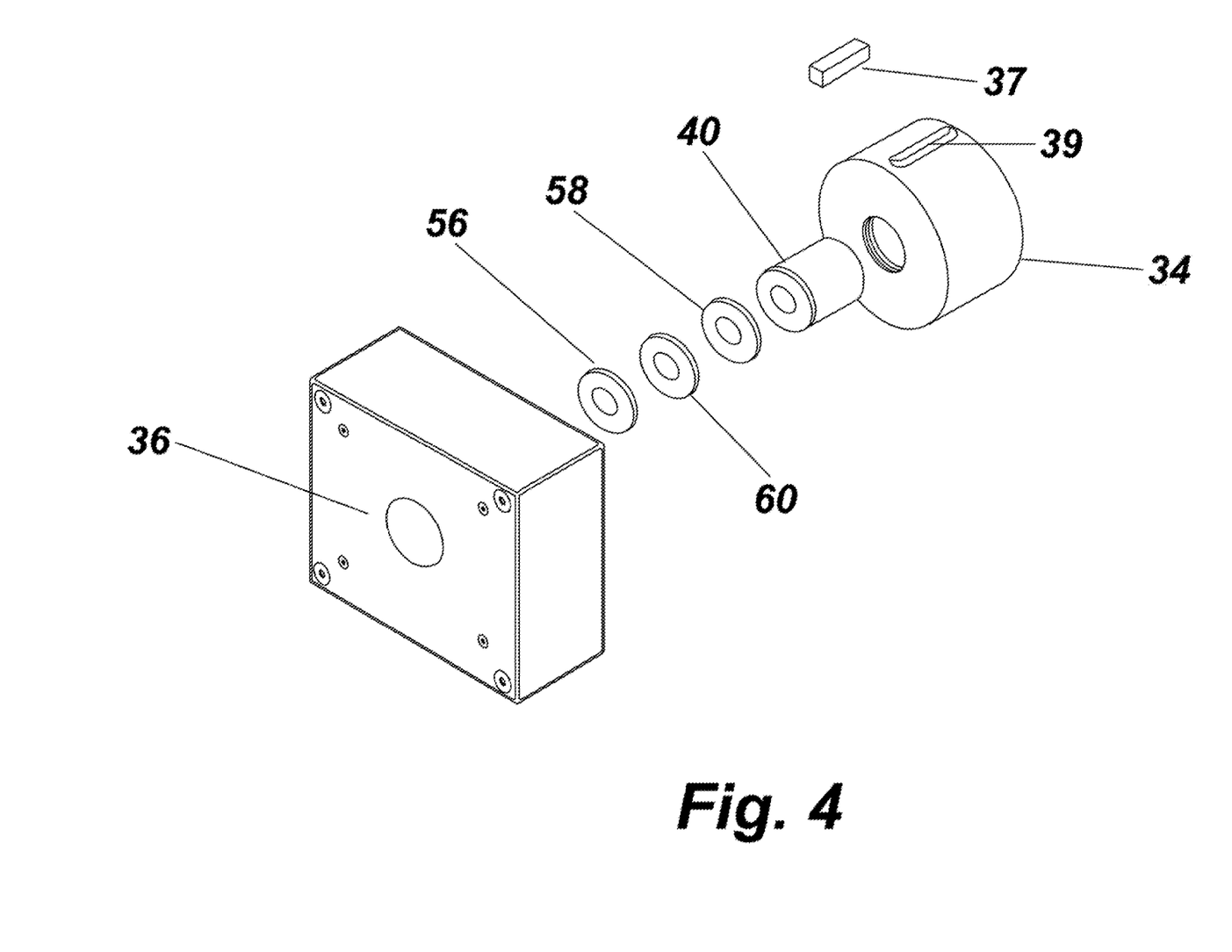
FIG. 4 is an exploded view of the spacer and piston assembly.

FIG. 4 depicts the threaded shaft 40 and piston assembly 34. The threaded shaft 40 pushes the piston 34 outward into the brake pads, causing the brake pads 22, 30 to clamp the rotor 18. The piston 34 is prevented from rotating in place by a key 37 for placement in alignment slot 39; the caliper base 46 having an adjoining slot 41. The resulting force directed back at the motor 20 is taken by the thrust washers 56 and 58 and is transferred through the spacer 36. The motor 20 does not bear any load through the motor shaft 37.

Figure 5A:
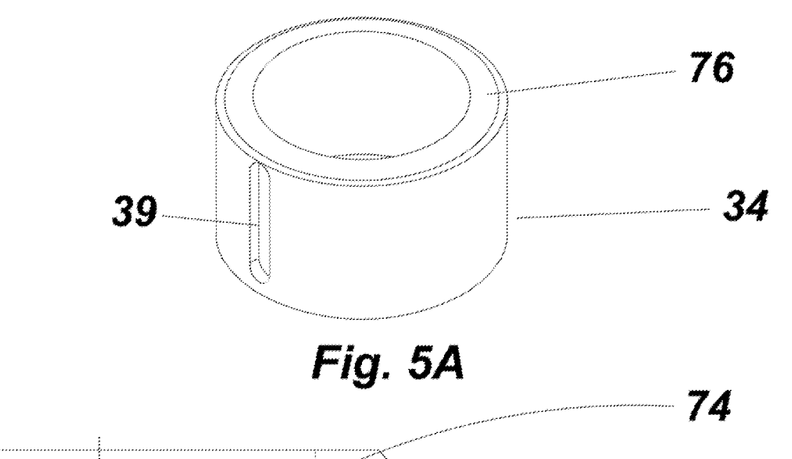
FIG. 5A is a perspective view of the piston.
Figure 5B:
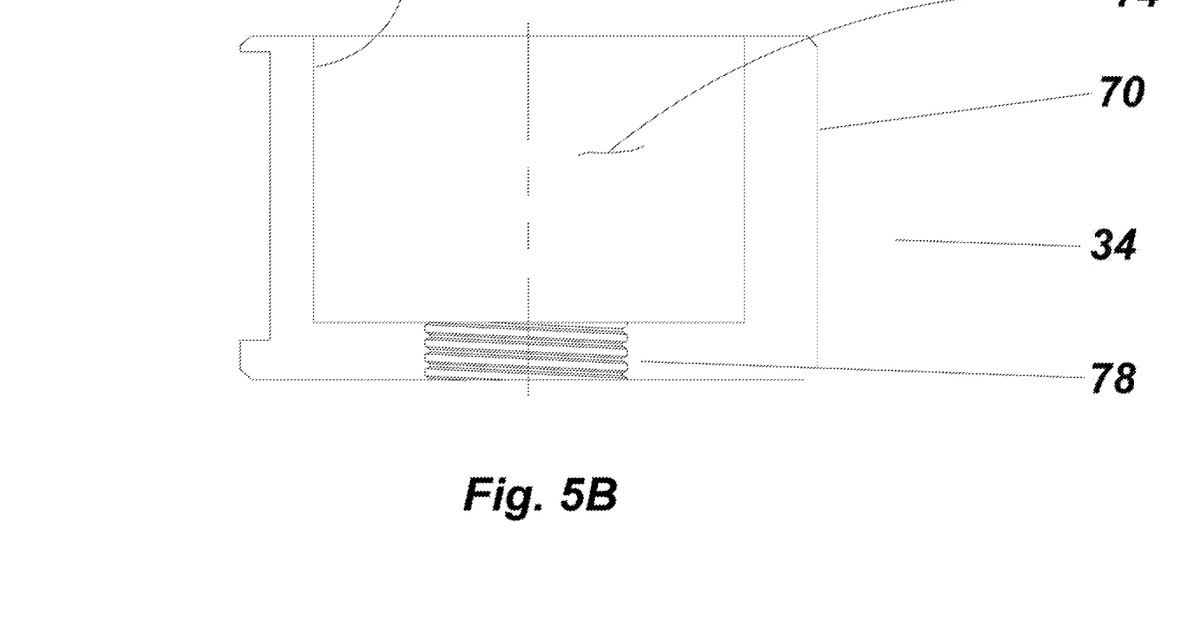
FIG. 5B is a cross-sectional view of the piston.

FIGS. 5A and 5B depict the piston 34 having a cylindrical outer wall 70 and an inner wall 72 forming a chamber 74 with a brake pad engagement surface 76 and a threaded aperture 78 for receipt of the threaded shaft 40. The alignment slot 39 is formed in the outer wall 70.

Figure 6A:
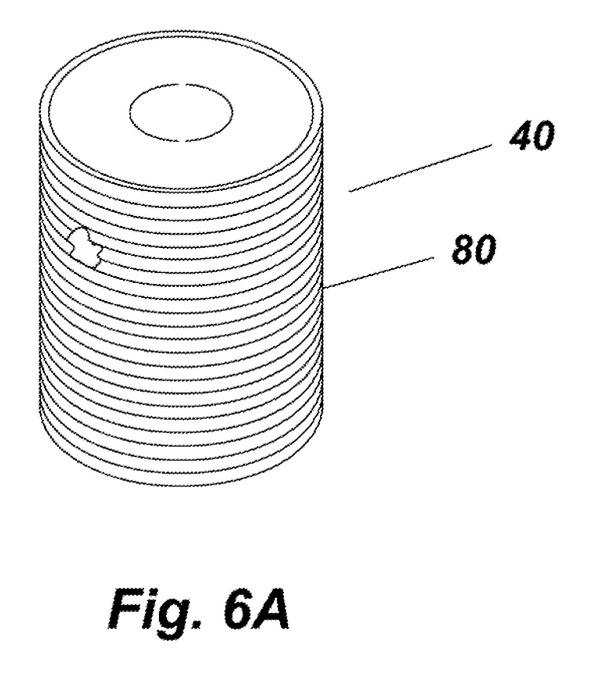
FIG. 6A is a perspective view of the threaded shaft.
Figure 6B:
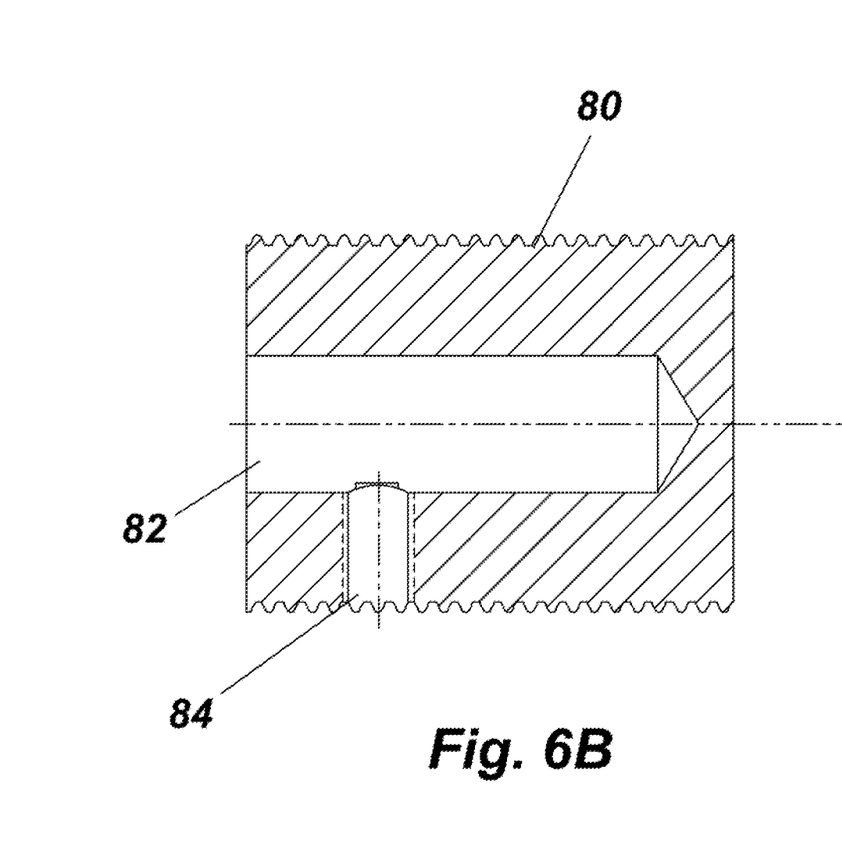
FIG. 6B is a cross-sectional view of the threaded shaft.
Figure 7A:
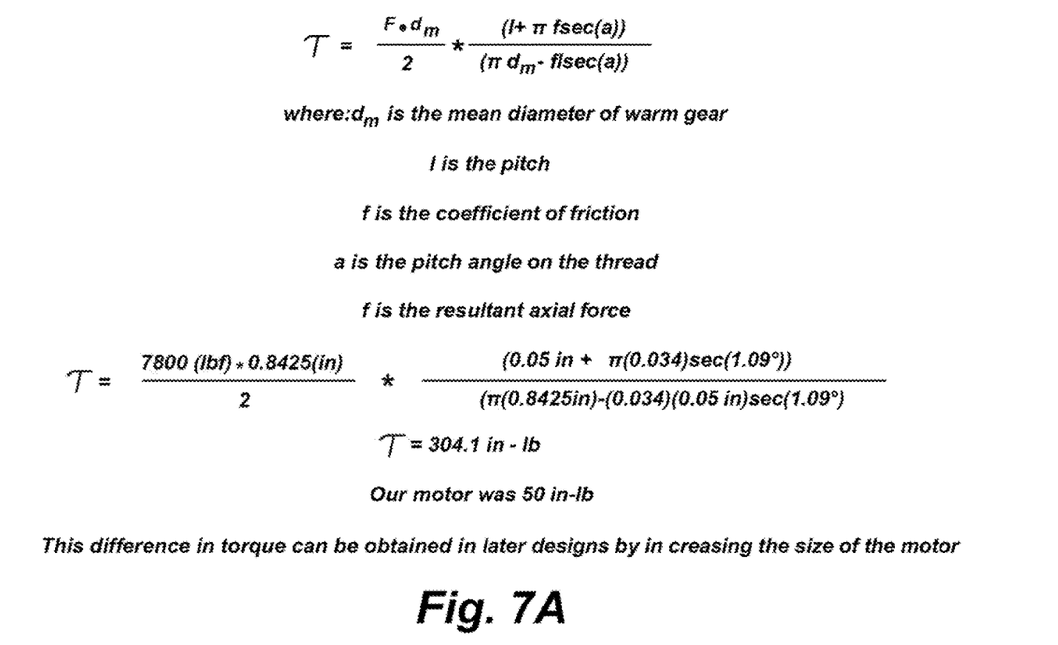
FIG. 7A provides the calculations for motor torque requirement.
Figure 7B:
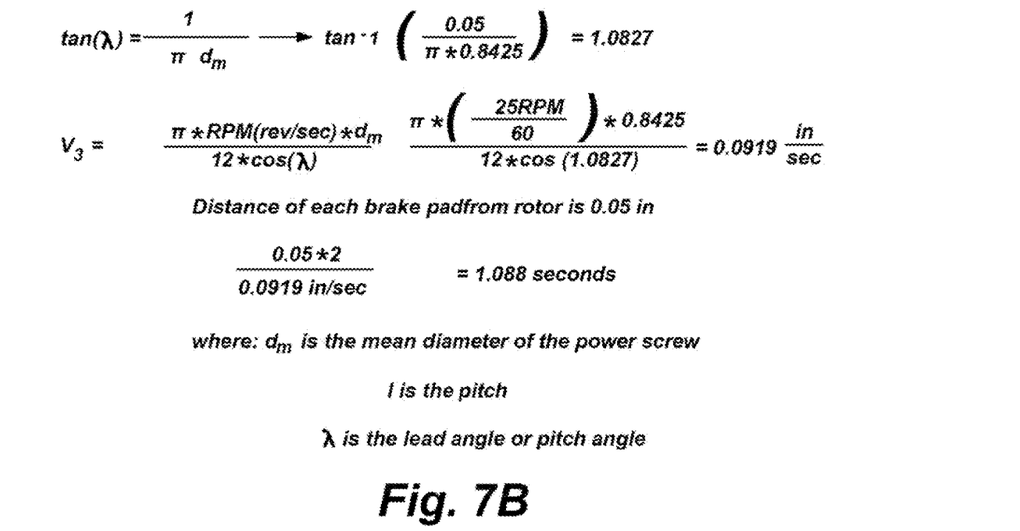
FIG. 7B provides the calculations for the threaded shaft linear velocities and forces.

FIGS. 6A and 6B depict the threaded shaft 40 having a threaded outer surface 80 constructed and arranged to engage the piston threaded aperture 78. The threaded shaft 80 includes a shaft receptacle 82 for receipt of the shaft extension 37. Set screw receptacle 84 is used to lock the shaft extension 37 to the threaded shaft 80. FIG. 7A provides the calculations for determining torque requirement of the motor based upon the gear pitch and resultant axial force. Referring to FIG. 7B, the calculations illustrate the linear velocities and forces found for a preferred embodiment of a preferred threaded shaft 40 and threaded outer surface 80, because of its size and mechanical advantage, using a standard thread. However, design iterations may include a custom, finer thread to increase mechanical advantage. The threaded outer surface 80 cannot be too fine, otherwise friction will become a factor. Friction is a key element to the system since it allows for constant braking force once the threaded shaft 80 fully engages.

Figure 8:
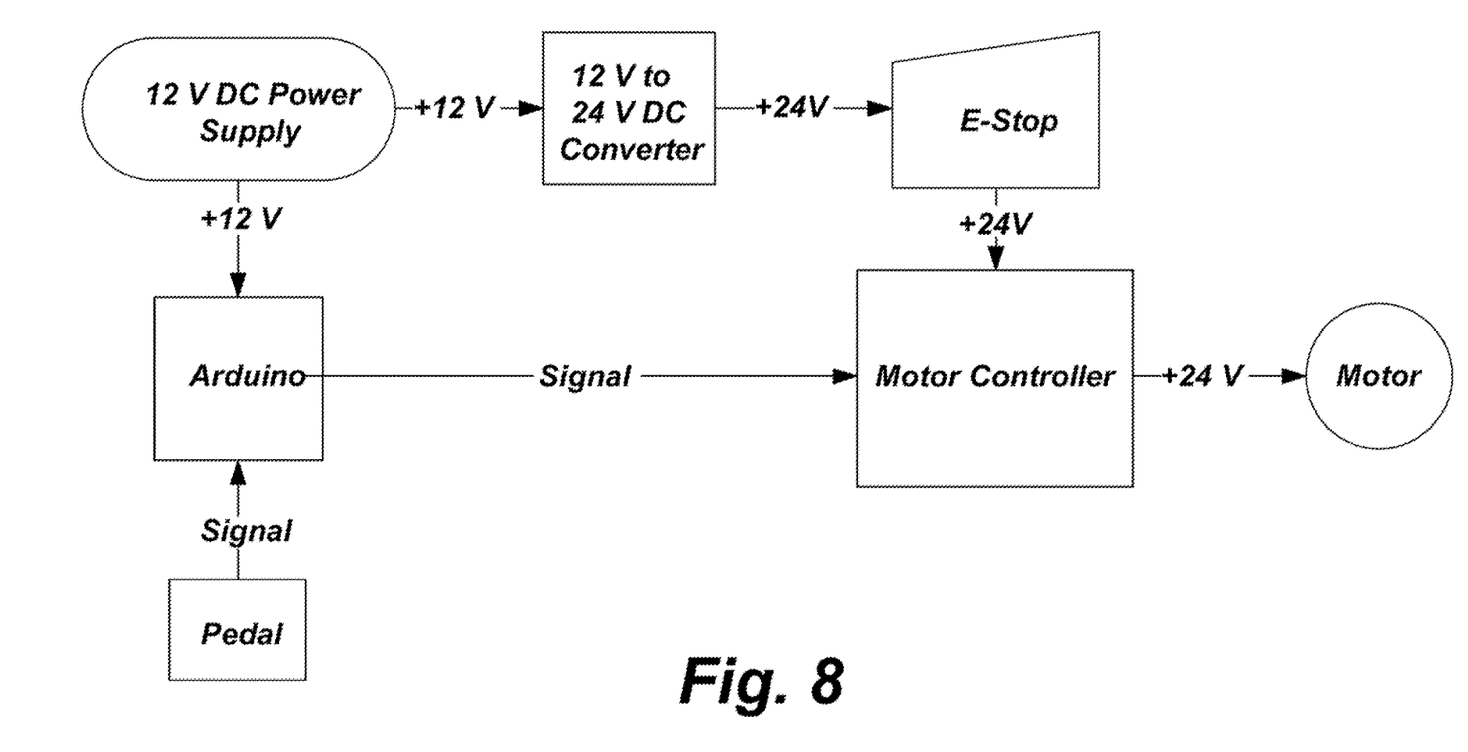
FIG. 8 is a block diagram of the electric system.

FIG. 8 is a block diagram of the electrical system that will drive the caliper. To provide sufficient power and braking force, in one embodiment a 12V DC powered motor is stepped up to 24V DC using a converter. However, a 12V, 24V, 36V, 48V or 72V system could also be used without the need for a stepper. The brake pedal is used to provide an input to the Arduino servo motor to signal when the motor is to engage. An E-Stop was also installed to prevent accidental power to the motor and to prevent damage to the prototype during non-planned operation.

Figure 9:
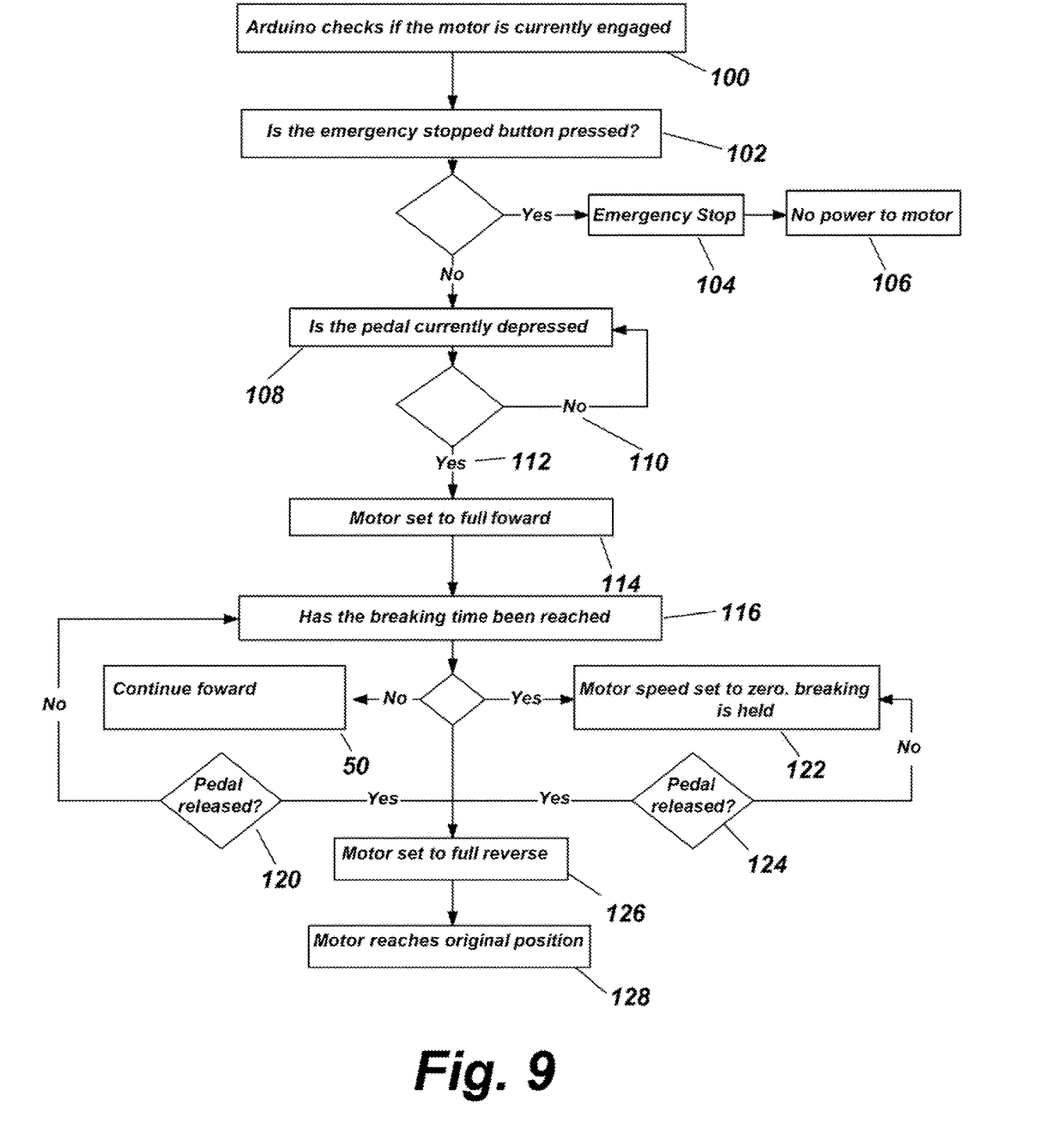
FIG. 9 is a flow diagram of the Arduino program.

FIG. 8-9 depicts a flowchart wherein the Arduino program is constantly checking for user input on the pedal. Once the program has detected that the brake pedal has been depressed and that the emergency stop button is not engaged, it will allow the motor controller to set the motor to full forward motion. As forward motion occurs, the program will determine if the braking time has been reached and will hold the motor at its final forward position until the pedal is released. Then, the motor controller will be directed to reverse the motor at full speed until the initial position is reached. Once this process is complete, the program is ready to begin another cycle upon another pedal depression. The Arduino code is broken down into main components of initializations, sub loops, and the main loop. The code begins with initializations of the input and output pins of the Arduino board and checks if the motor is engaged 100. Next, there are several sub loops that have all the functions needed in no particular order, these functions range from reading the inputs and setting the motor speed, and the loop that has the full forward and reverse cases with a timer incorporated. A check is made if an emergency stop button 102 is pressed, if pressed as an emergency stop 104 no power is provided to the motor 106. If the emergency button is not pressed a check is determined if the brake pedal is depressed 108. If not depressed the program cycles until the pedal is depressed 112. Depressing of the brake pedal allows the motor set to full forward 114 providing a loop wherein a calculation determines if the braking time has been reach 116, if not the braking continues forward 118 with checks if the pedal has been released 120. If the motor speed is set to zero the braking is held 122 until the pedal has been release 124. Once the pedal is released the motor is set to full reverse 126 until and stops reversing one the motor reaches the original position 128. A main loop, which calls upon each sub loop in correct order to essentially ensure that when a signal is read or not read, the next loop that should run does so. The system is based upon a power supply 130, typically 12V DC. Power 130 is provided to the Arduino logic program 132 which is coupled to a brake pedal 134 for receipt of a signal 136 that the brake pedal 134 has been actuated. The Arduino program 132 instructs the controller 138 which, unless an emergency stop 140 is actuated, provides power stepped up 142 from 12V DC to 24V DC to the electric motor 20.

Figure 10:
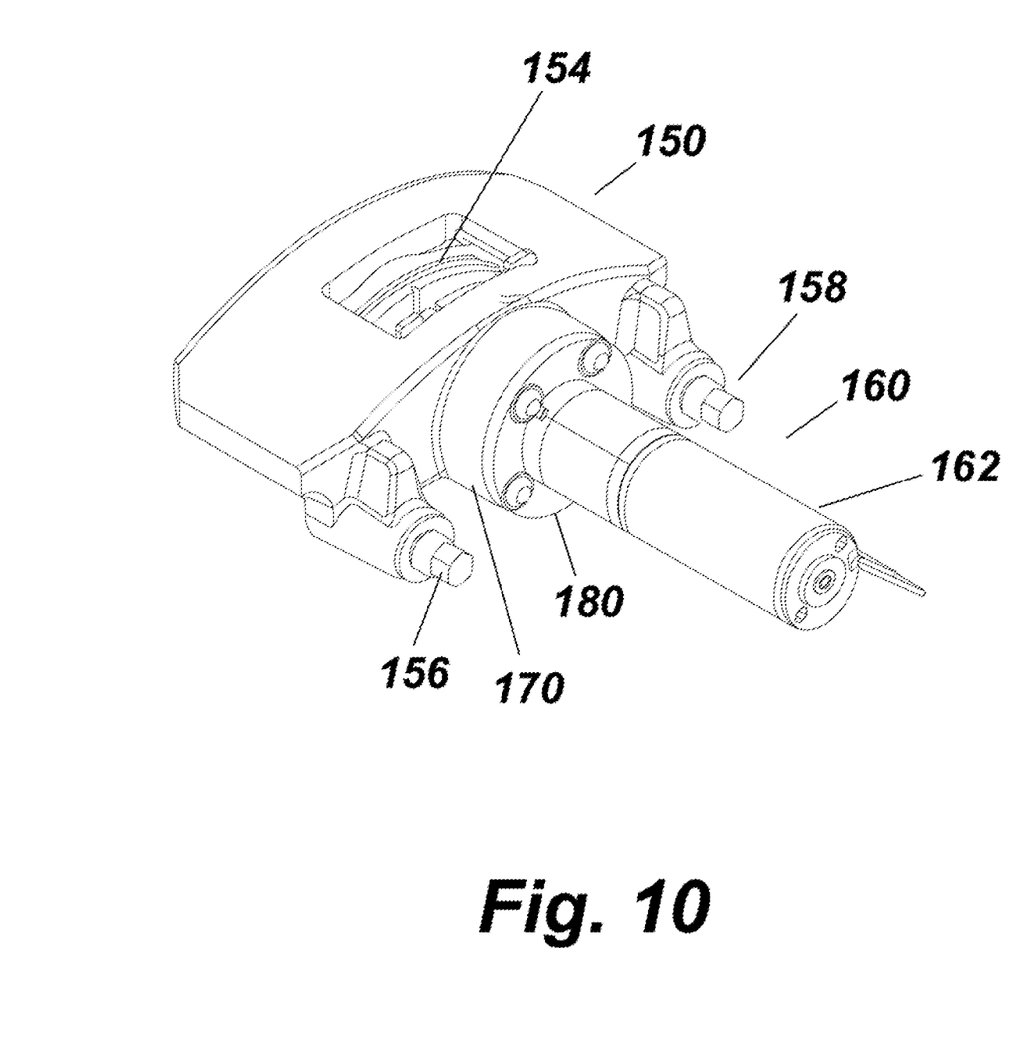
FIG. 10 is a perspective view of another embodiment of an electric disc brake system.
Figure 11:
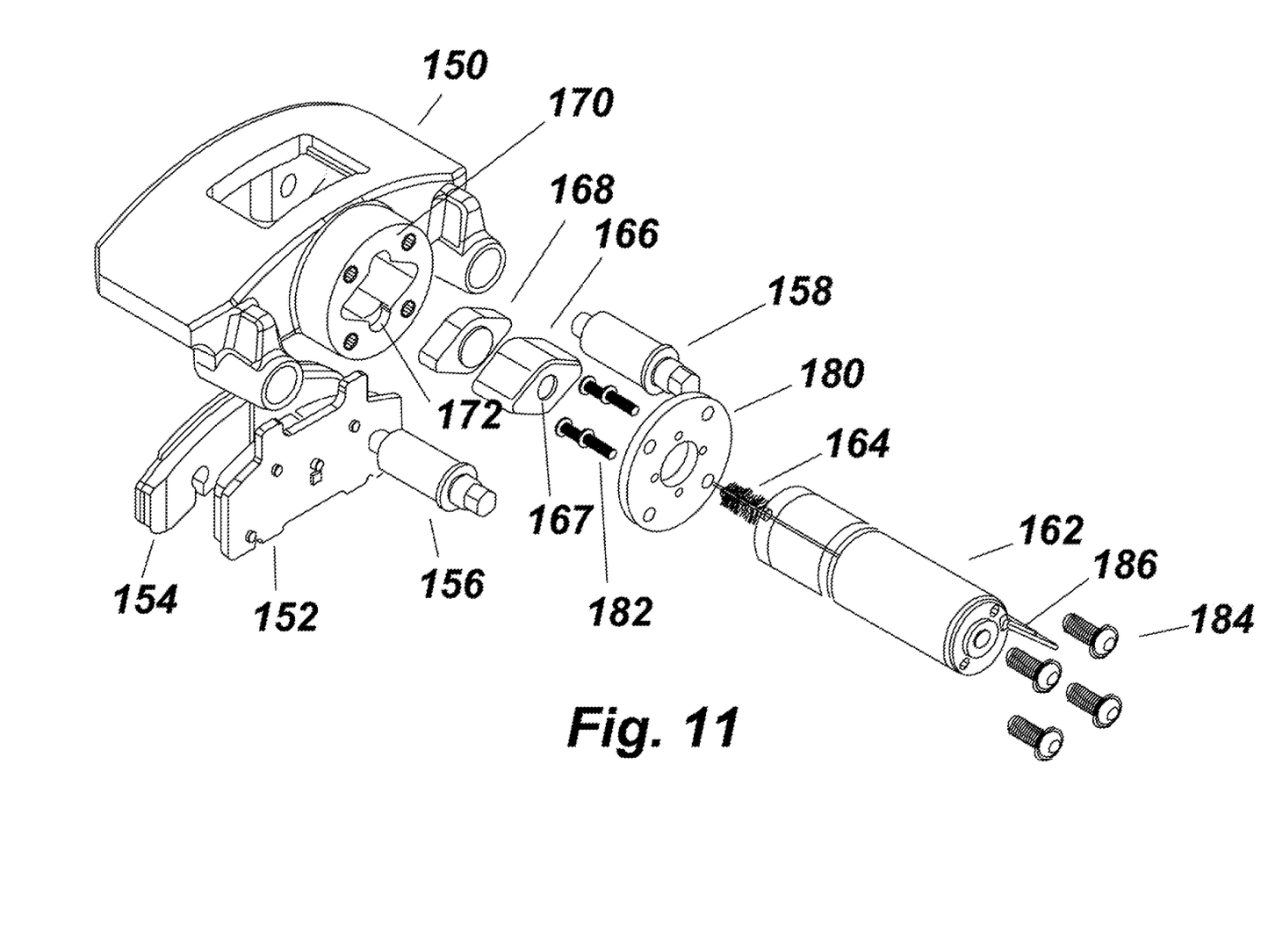
FIG. 11 is an exploded view thereof.

Referring to FIGS. 10-11, illustrated is another embodiment of the electric disc brake system for a trailer comprising a caliper assembly 150 attached to a trailer axle using a mounting bracket 16, the caliper assembly configured to straddle a rotor 18 similar to that depicted in FIG. 1. An inner brake pad 152 is slidably secured to the caliper 150 along an inner surface of a rotor, an outer brake pad 154 is slidably secured to the caliper 150 along an outer surface of the rotor. The caliper 150 is mounted to a mounting bracket with the fasteners 156, 158 which allow the caliper to balance over a rotor. In this embodiment the screw drive assembly 160 employs an electric servo motor 162 having a threaded shaft 164 for engaging a piston 166 having threaded receptacle 167. The piston 166 pushing against a piston plate 168 both of which have an oblong shape for positioning within the piston housing 170 having a reciprocal shaped opening 172. In the preferred embodiment the motor 162 is an Arduino servo motor for rotation of the threaded shaft 164 for linear movement of the piston 166 and piston plate 168 to apply brake force pressure against the brake pad 152. The caliper 150 provides uniform brake pad pressure by movement of the caliber allowing engagement of the outer pad 154 as the inner pad 152 is pressed. A mounted bracket 180 is secured to the motor 162 by fasteners 182. The motor 162 and mounting bracket 180 is secured to the piston housing 170 by fasteners 184. The motor 162 is coupled to a power source and controller by hard wire 186. In operation, the controller monitors user foot pressure on the brake pedal and operates the electric motor to move the piston into engaging the brake pads. The controller engaging the electric motor for a time period with the brake pads held in position until foot pressure is released. The electric motor rotates in a rearward direction to disengage the piston from the brake pads when the brake pedal pressure is removed.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited such specific embodiments. Indeed, various modifications of the described modes for carrying out the invention which are obvious to those skilled in the art are intended to be within the scope of the following claims.

What is claimed is:

1. An electric disc brake system for a trailer coupled to a towing vehicle comprising:
    a caliper assembly attached to a trailer axle, said caliper assembly configured to straddle a rotor coupled to a wheel;
    an inner brake pad slidably secured to said caliper along an inner surface of said rotor;
    an outer brake pad slidably secured to said caliper along an outer surface of said rotor;
    a screw assembly attached to said caliper comprising an electric motor for rotation of a threaded shaft for linear movement of a piston;
    a controller electrically coupled to said screw assembly; and
    a brake pedal coupled to said controller wherein said controller includes a loop calculation to determine if a predefined braking time has been reached, said loop calculation checks whether brake pedal engagement or an emergency stop is active or inactive, activates said electric motor to move said piston in a forward direction for the predefined braking time to reach a braking position, holds said electric motor in the braking position until said brake pedal is released, and activates said electric motor to move said piston in a reverse direction from the braking position upon release of said brake pedal and the predetermined braking time period has been reached;
    wherein movement of said brake pedal is detected by said controller for operating said electric motor whereby said threaded shaft is rotated for engaging said piston and applying brake force to press said inner brake pad against the rotor and moves the caliper assembly to engage said outer brake pad with the rotor applying a clamping force to slow the rotor when said brake pedal is engaged; and
    wherein said controller instructs said electric motor to operate at full speed to withdraw brake force from said piston when brake pedal pressure is removed.

2. The electric disc brake system according to claim 1 wherein said threaded shaft is operatively connected to the electric motor, said threaded shaft converting rotational motion of the electric motor into linear motion for movement of said piston.

3. The electric disc brake system according to claim 1 wherein said electric motor is 12-72 volts DC.

4. The electric disc brake system according to claim 3 including a converter to operate said electric motor on 12V DC wherein the converter steps the voltage to 24V DC.

5. The electric disc brake system according to claim 3 wherein said motor is an electric servo motor for rotation of said threaded shaft for linear movement of said piston and a piston plate to apply brake force pressure against said inner brake pad.

6. The electric disc brake system according to claim 1 wherein said controller monitors user foot pressure against said brake pedal, said controller operating said electric motor to rotate said threaded shaft in a forward direction to engage said brake pads in a predetermined position until the foot pressure is released wherein said electric motor is reversed to disengage brake force against said brake pads.

7. The electric disc brake system according to claim 1 wherein each said brake pad is positioned about 0.05 inches from the rotor when no pressure is applied to the brake pedal.

8. The electric disc brake system according to claim 1 wherein said piston includes a machine key to prevent rotation of the piston when said screw drive assembly is engaged.

9. The electric disc brake system according to claim 1 wherein said piston is oblong shaped.

10. An electric disc brake system for a trailer coupled to a towing vehicle comprising:
- a caliper assembly attached to the trailer axle with floating fasteners, said caliper assembly configured to straddle a rotor coupled to a wheel;
- an inner brake pad slidably secured to said caliper along an inner surface of said rotor;
- an outer brake pad slidably secured to said caliper along an outer surface of said rotor;
- a screw drive motor assembly attached to said caliper comprising an electric servo motor for rotation of a threaded shaft of said screw drive motor for linear movement of a piston engaging said inner brake pad; and
- a controller electrically coupled to said screw drive motor assembly; and
- a brake pedal mounted in said towing vehicle, said controller operating on a loop calculation to determine if a predetermined braking time has been reached wherein said controller includes said loop calculation, said loop calculation checks whether brake pedal engagement or an emergency stop is active or inactive, activates said electric motor to move said piston in a forward direction for the predefined braking time to reach a braking position, holds said electric motor in the braking position until said brake pedal is released, and activates said electric motor to move said piston in a reverse direction from the braking position upon release of said brake pedal and the predetermined braking time has been reached;
- wherein said controller monitors user foot pressure on the brake pedal providing brake input signals from the towing vehicle for operating said screw drive, said controller engaging electric motor for rotating said threaded shaft for linear movement of said piston and a piston plate to apply brake force pressure against said inner brake pad, said controller engaging said electric motor for the predetermined braking time with said brake pads held in position until foot pressure is released wherein said electric motor rotates in a rearward direction from said braking position to disengage said piston from said brake pads; and
- wherein release of said brake pedal allows said controller to cause said motor to operate at full speed in the rearward direction.

11. The electric disc brake system according claim 10 wherein said electric motor includes a converter to step said motor to 24V DC.

12. The electric disc brake system according to claim 10 wherein said piston and said piston plate are oblong in shape and positioned within a reciprocal-shaped piston housing to prevent rotation of the piston during operation.

13. The electric disc brake system according to claim 10 including an emergency stop coupled to said controller.

\* \* \* \* \*